United States Patent Office 3,039,926
Patented June 19, 1962

3,039,926
19-HYDROXY PREGNENES
Gilbert M. Shull, Huntington Station, N.Y., assignor to Chas. Pfizer & Co. Inc., New York, N.Y., a corporation of Delaware
No Drawing. Filed Oct. 10, 1958, Ser. No. 766,384
8 Claims. (Cl. 167—65)

This application is concerned with new and useful steroid compounds and with compositions containing them. More particularly it is concerned with certain therapeutically useful 19-hydroxylated steroid compounds and with pharmaceutical compositions containing them together with pharmaceutically acceptable excipients. Also included within the scope of this invention is a process for the introduction of a 19-hydroxyl group using a microbiological method.

It has now been found that by contacting a steroid compound having an angular methyl group at the 10-position to the hydroxylating activity of an organism selected from the group consisting of the McRay and the Matsumoto strain of *Hypochnus sasakii* Shirai, both of which are available from the Centralbureau voor Schimmelculture under these names, it is possible to replace a hydrogen of the methyl group with an hydroxyl group. The reaction can be carried out by contacting the steroid with the organisms themselves, for example, under conditions of submerged, aerated fermentation or with enzyme systems of the organism.

A variety of steroid compounds may be used as starting compounds for the valuable process of this invention, providing of course that it possesses a 19-methyl group. Many compounds can be prepared including a larger number of new and therapeutically active compounds. This invention includes within its scope a method of preparing new 19-hydroxymethyl steroid compounds as well as the new and useful compounds themselves and therapeutically useful compositions containing them. The most important compounds, both old and new, which can be prepared using the process of this invention include those having from 18 to 21 carbon atoms in the steroid nucleus. Representative compounds which can be prepared include the 19-hydroxyl derivatives of testosterone, 17-hydroxy-desoxycorticosterone, desoxycorticosterone, Δ¹-hydrocortisone, Δ¹,⁶-hydrocortisone and cortisone.

Compounds having various substituents on the steroid nucleus may serve successfully as substrates for this reaction. This includes substituents at, for instance, the 9, 11, 14, 15, 16 and/or 17-positions. Hydroxyl groups may be present at the 2, 6, 9, 11, 14, 15, 17 and/or 21-positions; alkyl groups or an ethynyl group may be at the 17-position. The nucleus may be saturated or there may be double bonds at the 1, 4, 6, 9, 8(14), 14 or 16-positions including conjugated and unconjugated combinations of these. Epoxide groups may occur at the 5(6), the 9(11), 14(15), 16(17), 17(20) or 21(22)-positions. Halogen atoms may be substituted at the 2, 6, 9, 12, 14 or 16-positions. In addition to the carbonyl at the 3-position, carbonyl groups may also occur at the 11, 16, 20 or 21-positions. Various derivatives of these including, for example, the diazomethane reaction product of a 21-aldehyde steroid and compounds prepared from this product by known reactions including hydrolysis with halogen acid, the dehalogenated hydrolysis product and other derivatives prepared by known reactions can be used as starting materials for the products of this invention.

The new compounds within the purview of this invention are represented by the formulas:

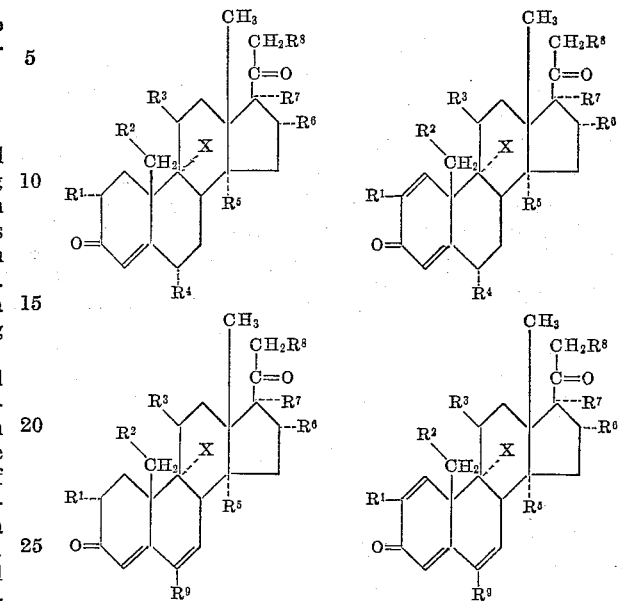

wherein X is selected from the group consisting of hydrogen, halogen, methoxy and ethoxy; R¹ is selected from the group consisting of hydrogen and methyl; R² is selected from the group consisting of hydroxyl and acylated hydroxyl; R³ is selected from the group consisting of keto and β-hydroxyl; R⁴ is selected from the group consisting of hydrogen, fluorine and α-methyl; R⁵ is selected from the group consisting of hydrogen and α-hydroxyl; R⁶ is selected from the group consisting of hydrogen, α-methyl, α-hydroxyl and acylated α-hydroxyl; R⁷ is selected from the group consisting of hydrogen and α-hydroxyl; R⁸ is selected from the group consisting of hydrogen, hydroxyl and acylated hydroxyl; R⁹ is selected from the group consisting of hydrogen and methyl; two of R¹, R⁴ and R⁶ being hydrogen in a particular compound; an acylated hydroxyl group being derived from mono and dicarboxylic acids containing up to four carbon atoms; and alkali and alkaline earth metal salts of said dicarboxylic acids.

Suitable starting materials for the preparation of the new compounds of this invention include those represented by the formulas set forth above except that in the starting materials R² is of course hydrogen. These compounds are all known or can be prepared by procedures well known in the art. Halogen and alkoxy substituents are introduced using the well known route of Fried and Sabo set forth in the Journal of the American Chemical Society, vol. 79, page 1130. The compounds 9α-fluoro-Δ¹,⁴-hydrocortisone, 9α-fluoro-Δ⁴,⁶-hydrocortisone, 9α-fluoro-Δ¹,⁴-21-desoxy-hydrocortisone and 9α-fluoro-Δ⁴,⁶-21-desoxy-hydrocortisone are prepared by the method of Fried et al., the Journal of the American Chemical Society, vol. 77, page 4181. Oxidation with chromium trioxide in acetic acid gives the corresponding 11-keto compounds. A variety of 6-methyl compounds can be prepared by the method of Spero et al. as described in the Journal of the American Chemical Society, vol. 78, page 6213. These include, for example, 6α-methyl-11-keto-progesterone, 6α-methyl-hydrocortisone acetate and 6α-methyl-prednisolone acetate all of which may be oxidized to the corresponding 11-keto compounds with N-bromoacetamide in pyridine. Meystre et al. in Helvetica Chimica Acta, vol. XXXIX, page 734, describe a method for introducing double bonds at the 1-position of $\Delta^4$-3-ketosteroids or the 1 and 4-positions of A-ring saturated 3-ketosteroids using selenium dioxide. Shull, Kita and Davisson in U.S. Patent No. 2,745,784 describe a microbiological method using an organism of the genus Curvularia whereby an α-hydroxyl group may be introduced at the 14-position of a variety of steroids.

A double bond at the 6-position of many steroid compounds can be obtained with chloranil in refluxing n-amyl alcohol by the method of Agnello and Laubach set forth in the Journal of the American Chemical Society, vol. 79, page 1257. A variety of other 6-methylated compounds useful as starting materials for the compounds of this invention including, for example, 6α-methyl-9α-fluoro-hydrocortisone and the corresponding prednisolone analogs can be prepared by the method of Spero et al. as described in the Journal of the American Chemical Society, vol. 79, page 1515. These compounds, and other 6-dihydro compounds described above are converted to $\Delta^6$-compounds by the method of Agnello and Laubach.

The production of 16α-methyl compounds has been described by Arth et al. in the Journal of the American Chemical Society, vol. 80, page 3160. Certain of the 2α-methyl compounds which are useful as starting materials for the preparation of the useful compounds of this invention are described by Hogg et al. in the Journal of the American Chemical Society, vol. 77, pages 4438 and 6401.

An hydroxyl group may be introduced at the 16-position using *Streptomyces roseochromogenus* under suitable conditions as described in the Journal of the American Chemical Society, vol. 79, page 4818.

A recently issued series of United States patents describes the preparation of a large number of 6-fluoro steroid compounds. These include not only basic hydrocortisone, cortisone, progesterone, desoxycorticosterone, corticosterone and progesterone compounds with halogen at the 6-position, but also a wide variety of compounds with other substituents on the molecules such as 2-methyl, 9-halo and 16α-hydroxy. Specific patents from this series which describe compounds useful as starting materials in this invention are:

| | |
|---|---|
| 2,838,496 | 2,838,541 |
| 2,838,498 | 2,838,544 |
| 2,838,499 | 2,838,545 |
| 2,838,501 | 2,838,546 |
| 2,838,502 | 2,838,547 |
| 2,838,528 | 2,838,548 |
| 2,838,536 | 2,841,600 |
| 2,838,540 | |

It will be recognized by those skilled in the art that there are, in these compounds, a number of hydroxyl groups which can be readily esterified by known methods. It is specifically intended to include within the purview of this invention, new compounds of the class described above in which an hydroxyl group and/or groups at the 16, 19 or 21-position is acylated with an acyl hydrocarbon group. The term "acyl hydrocarbon" includes acyl hydrocarbon groups containing only carbon, hydrogen and oxygen derived from monocarboxylic acids, dicarboxylic acids containing up to a total of four carbon atoms. In the event that the acyl hydrocarbon group chosen is one derived from a dicarboxylic acid, is is often advantageous to treat a therapeutically active compound with a base derived from an alkali metal or alkaline earth metal to prepare a metal salt. These bases include, for example, sodium, potassium, barium and calcium hydroxide as well as the corresponding carbonates and bicarbonates. Products so prepared are especially useful because of their increased solubility in water.

These hydroxyl groups may be readily esterified by standard methods. It is well known that the 16-hydroxyl group can be esterified without concomitant esterification of the 21-hydroxyl group. Although Fischer esterification and transesterification procedures may be employed, in general, it is preferred to form the esters by treatment with an acylating agent such as an acyl hydride or anhydride in the presence of a tertiary amine base such as pyridine or dimethylaniline.

Free alcohols are prepared from the corresponding esters by gentle hydrolysis, for example, with dilute hydrogen chloride in aqueous methanol or with potassium carbonate in aqueous methanol. Since the rate at which the ester groups at the 16, 19 and 21 positions are hydrolyzed varies considerably from position to position, it is possible to prepare compounds in which there are diverse acyl groups at these various positions.

As previously mentioned, it has been found that by contacting a steroid compound of the type described above with the oxygenating activity of the selected microorganism, i.e. with the organism itself or with the enzyme systems of the organism, the 19-hydroxylation of the steroid compound may be effected. The effectiveness of the steroid-hydroxylating microorganisms for the process of this invention may be determined by cultivating the organism in a suitable nutrient medium containing a carbohydrate source such as sugars, starch and glycerol, an organic nitrogen source such as soy bean meal, cotton seed meal, peanut meal and cornsteep liquor, and mineral salts such as sodium chloride, sodium nitrate, magnesium sulfate and potassium phosphate. In addition to these, a buffering agent, such as calcium carbonate or potassium dihydrogen phosphate, and a foam preventer such as vegetable oils or animal oils may be used. The organism is best grown under submerged conditions of agitation and aeration at temperatures ranging from about 23° C. to about 32° C., but preferably from about 26° to about 30° C. The preferred pH range is from 4 to 5. During the fermentation, the broth is agitated with stirrers of suitable design for incorporating air into the broth. Aeration at a rate of from about ½ to 2 volumes of air per volume per minute produces satisfactory results. The steroid compound as a solid or as a solution in a suitable solvent, for example, acetone and lower alkanols such as ethanol, is added to the cultivated microorganism under sterile conditions and the mixture agitated and aerated in order to bring about growth of the microorganism and oxygenation of the steroid substrate. The steroid may be added when the medium is seeded under sterile conditions with a culture of the microorganisms or after growth of the organism is established.

In some cases it may be found advisable to add the steroid compound after growth of the microorganisms has been established in the nutrient medium under aerobic conditions. This is particularly true, if during the initial stages of growth of the microorganism, there is a tendency to produce undesired by-products from the steroid substrate. The acetate or other lower alkanoic ester of the selected steroid may be used in place of the alcohol itself. Best results are obtained when, after growth of the organism is established, the medium is diluted with an approximately equal volume of water either before or immediately after addition of the steroid substrate. Alternatively, enzyme preparations from the growth of the organism may be used for conducting the process. A further, most useful method is one in which the microorganism is grown on a suitable nutrient medium under aerobic conditions in the absence of the steroid. The mycelial growth may then be filtered from the broth and may, if desired, be washed with distilled water. The mycelium is then suspended in distilled water containing the steroid substrate. Agitation of the mixture and aeration is continued for a period of from about 12 to 48 hours after which the products of the reaction are recovered. This process has the advantage of ease of recovery of the steroid compound, since the various nutrient material originally used to obtain growth of the microorganism are now absent as well as the various material excreted by the growing organism during the initial period. In some cases even better total yields of oxygenated products are obtained by this method than is the case when the steroid is added at the beginning or at an intermediate period directly to the whole fermentation broth. Other methods familiar to enzyme chemists may be utilized for conducting the present oxygenation process. The proportion of products and the rate of oxygenation as well as the nature of the by-products formed, may vary depending on the use of the whole fermentation broth or of the isolated washed mycelium.

In general a concentration of not greater than one to two percent by weight of substrate based on the total weight is used in conducting this process, although sometimes other concentrations may be found to be more favorably used. Since the solubility of the starting material in water is quite limited, an excess of the material may be slowly converted to the oxygenated product. However, the state of subdivision of the steroid when added to the oxygenating system, i.e. growing microoragnism or enzyme system, does not seem to greatly affect the yield and nature of the products under otherwise identical conditions. If a water-miscible solvent solution of the steroid compound is added to the aqueous fermentation system, the steroid is generally precipitated in finely divided form in the presence of a large excess of water. This does not seem to appreciably improve the rate of reaction as compared to the addition of dry, relatively large crystals of the steroid.

After completion of the oxygenating process, the product may be recovered from the mixture by extraction with a suitable water-immiscible solvent. Chlorinated lower hydrocarbons, ketones and alcohols are useful. These include chloroform, methylene chloride, trichloroethane, ethylene dichloride and so forth. The extract of product and unreacted starting material may be concentrated to a small volume or to dryness to obtain a solid product. Purification of the product may be accomplished in several ways. Most useful is the separation by means of chromatography of the product from starting material and from other products such as more highly oxygenated materials that may be formed during the reaction. Adsorbents such as silica gel, alumina or other suitable adsorbents are particularly useful for this purpose. It has been found that a column prepared from a mixture of silica gel and a lower alcohol, especially ethanol, is particularly useful for the separation of the steroid starting materials. The steroid mixtures may be applied to columns of adsorbents such as silica gel in concentrated chloroform or methylene chloride solution. The column may then be washed with additional amounts of the solvent to remove such impurities as fats and pigments. The adsorbed mixture then is separated by the gradual addition of a mixture of the solvent together with a small percentage, for example, 1 to 5% of a lower alcohol (methanol, ethanol, etc.). The materials may be separated and the separated compounds gradually eluted from the column by utilization of a mixture of solvents of gradually increasing polarity; for instance, a mixture of methylene chloride and a minor, gradually increasing amount of ethanol is very useful.

Fractions of the eluted materials from the chromatographic columns may be checked for the nature of the product by subjecting small portions of the solutions to chromatograpy on paper by methods well known in the art. Methods which are particularly useful for conducting this type of separation and analysis are described in detail in U.S. Patent No. 2,602,769, issued on July 8, 1952, to H. C. Murray et al., in the copending patent application, Serial No. 276,678, filed March 14, 1952, by Gilbert M. Shull et al., and in a publication by Shull, Abstracts, 126th Meeting of the American Chemical Society, p. 9A, New York, 1954.

The biologically active compounds of this invention may be administered alone or in combination with acceptable pharmaceutical carriers, the choice of which is determined by the preferred route of administration, the solubility of the compound and standard pharmaceutical practice. In general, the dosage of these compounds is of approximately the same order of magnitude as the dosages of hydrocortisone, and these compounds are useful to treat the types of pathological conditions often treated with hydrocortisone. Because of their great adrenocortical activity it is sometimes possible to use dosages of these compounds which are lower than those of hydrocortisone.

For oral administration the compounds may be administered in the form of tablets containing excipients such as starch or milk sugar. Aqueous suspensions and elixirs which may be sweetened or flavored may also be used. To apply these therapeutic agents topically, they may be prepared in the form of ointments and slaves in suitable bases especially non-aqueous petrolatum type bases. For intra-articular injection aqueous suspensions may be employed. In this case various suspending and wetting agents may be added to the compositions to obtain a suspension not tending to settle out easily or to pack down in the bottle in which it is stored. Intramuscular and subcutaneous dosage forms may also be prepared by standard pharmaceutical practice.

The following examples are given solely for the purpose of illustration and are not to be construed as limitations of this invention, many apparent variations of which are possible without departing from the spirit or scope thereof.

A culture of the McRay strain of *Hypochnus sasakii* Shirai, herein referred to, has been deposited in the United States in the American Type Culture Collection, Washington, D.C., under the number ATCC 13,289; and a culture of the Matsumoto strain herein referred to, under the number ATCC 13,290.

EXAMPLE I

$\Delta^4$-Pregnene-17α,19,21-Triol-3,20-Dione

A culture of the Matsumoto strain of *Hypochnus sasakii* Shirai obtained from the Centralbureau voor Schimmelculture was propagated on an agar nutrient medium and transferred to seven Fernbach flasks each of which contained 1000 cc. of the following medium:

| | |
|---|---|
| Malt extract (Difco) _____ g__ | 10 |
| Dextrose hydrate _____ g__ | 50 |
| $KH_2PO_4$ _____ mg__ | 870 |
| $MgHPO_4$ _____ mg__ | 400 |
| $CaCl_2 \cdot H_2O$ _____ mg__ | 370 |
| $H_2SO_4$ (2 N solution) _____ ml__ | 5.7 |
| Urea [1] _____ g__ | 3 |

[1] Prepared and autoclaved separately.

Trace elements were provided by adding 20 ml. of a solution containing:

| | Mg./l. |
|---|---|
| $FeCl_3 \cdot 6H_2O$ _____ | 500 |
| $MnCl_2 \cdot 4H_2O$ _____ | 360 |
| $ZnCl_2$ _____ | 200 |
| $CuSO_4 \cdot 5H_2O$ _____ | 50 |

The pH of the medium was adjusted to 4.5 with aqueous sodium hydroxide (distilled water).

After five days' shaking at 28° C., 250 mg. of $\Delta^4$-pregnene-17α,21-diol-3,20-dione was added to each flask. After an additional two days' shaking at 28° C. the fermentation was stopped and the broth extracted three times with an equal volume of chloroform. The combined chloroform extracts were applied to a silica gel chromatography column which was eluted with mixtures of chloroform and ethanol. The desired product was isolated in this manner.

The identity of the product was established using side by side paper chromatography against a known sample of $\Delta^4$-pregnene-17α,19,21-triol-3,20-dione prepared by an unequivocal method. Two different chromatographic systems were employed. In the first, the impregnating medium comprised 28 parts water and 72 parts acetone, and the developing solution comprised 15 parts tetrahydrofuran, 20 parts ethanol, 80 parts water and 85 parts toluene. In the second, the impregnating medium comprised 40 parts formamide and 60 parts methanol. The developing solution was chloroform saturated with formamide.

EXAMPLE II

$\Delta^4$-Pregnene-17$\alpha$,19,21-Triol-3,20-Dione

A culture of the McRay strain of *Hypochnus sasakii* Shirai obtained from the Centralbureau voor Schimmelculture was propagated on an agar nutrient medium and transferred to seven Fernbach flasks each of which contained 1000 cc. of the following medium:

| | |
|---|---|
| Malt extract (Difco) | g-- 10 |
| Dextrose hydrate | g-- 50 |
| $KH_2PO_4$ | mg-- 870 |
| $MgHPO_4$ | mg-- 400 |
| $CaCl_2 \cdot H_2O$ | mg-- 370 |
| $H_2SO_4$ (2 N solution) | ml-- 5.7 |
| Urea [1] | g-- 3 |

[1] Prepared and autoclaved separately.

Trace elements were provided by adding 20 ml. of a solution containing:

| | Mg./l. |
|---|---|
| $FeCl_3 \cdot 6H_2O$ | 500 |
| $MnCl_2 \cdot 4H_2O$ | 360 |
| $ZnCl_2$ | 200 |
| $CuSO_4 \cdot 5H_2O$ | 50 |

The pH of the medium was adjusted to 4.5 with aqueous sodium hydroxide (distilled water).

After five days' shaking at 28° C., 250 mg. of $\Delta^4$-pregnene-17$\alpha$,21,diol-3,20-dione was added to each flask. After an additional two days' shaking at 28° C. the fermentation was stopped and the broth extracted three times with an equal volume of chloroform. The combined chloroform extracts were applied to a silica gel chromatography column which was eluted with mixtures of chloroform and ethanol. $\Delta^4$-pregnene-17$\alpha$,19,21-triol-3,20-dione was recovered in this manner.

EXAMPLE III

$\Delta^4$-Androstene-3,19-Diol-17-One

The procedure of Example I was repeated using $\Delta^4$-androstene-3-ol-17-one to prepare the known compound $\Delta^4$-androstene-3,19-diol-17-one.

EXAMPLE IV

17$\alpha$-Ethyl-19-Hydroxytestosterone

The procedure of Example I was repeated using 17$\alpha$-ethyl-testosterone to prepare the known 17$\alpha$-ethyl-19-hydroxytestosterone.

EXAMPLE V

17$\alpha$-Propyl-19-Hydroxytestosterone

The procedure of Example I was repeated using 17$\alpha$-ethyl-testosterone to prepare the known 17$\alpha$-propyl-19-hydroxytestosterone.

The new and therapeutically useful compounds within the purview of this invention form a large but determinable number. The following compounds, all of which are prepared from known compounds, are exemplary of some of the compounds which can be prepared using the process of this invention.

$\Delta^4$-pregnene-11$\beta$,17$\alpha$,19,21-tetrol-3,20-dione
$\Delta^{1,4}$-pregnadiene-11$\beta$,17$\alpha$,19,21-tetrol-3,20-dione
$\Delta^{1,4}$-pregnadiene-11$\beta$,14$\alpha$,19,21-tetrol-3,20-dione
6$\alpha$-fluoro-$\Delta^4$-pregnene-11$\beta$,17$\alpha$,19,21-tetrol-3,20-dione
6$\alpha$-fluoro-$\Delta^4$-pregnene-11$\beta$,17$\alpha$,19,21-tetrol-3,20-dione
6$\alpha$-fluoro-$\Delta^4$-pregnene-11$\beta$,19-diol-3,20-dione
6$\alpha$-fluoro-$\Delta^4$-pregnene-19-ol-3,11,20-trione
6$\alpha$-fluoro-9$\alpha$-bromo-$\Delta^4$-pregnene-11$\beta$,17$\alpha$,19,21-tetrol-3,20-dione
6$\alpha$,9$\alpha$-difluoro-$\Delta^4$-pregnene-11$\beta$,17$\alpha$,19,21-tetrol-3,20-dione
6$\alpha$-fluoro-$\Delta^{1,4}$-pregnadiene-11$\beta$,17$\alpha$,19,21-tetrol-3,20-dione
6$\alpha$-fluoro-9$\alpha$-bromo-$\Delta^{1,4}$-pregnadiene-11$\beta$,17$\alpha$,19,21-tetrol-3,20-dione
6$\alpha$,9$\alpha$-difluoro-$\Delta^{1,4}$-pregnadiene-11$\beta$,17$\alpha$,19,21-tetrol-3,20-dione
6$\alpha$,9$\alpha$-difluoro-$\Delta^{1,4}$-pregnadiene-17$\alpha$,19,21-triol-3,11,20-trione
6$\alpha$,9$\alpha$-difluoro-$\Delta^4$-pregnene-17$\alpha$,19-diol-3,11,20-trione
6$\alpha$-fluoro-9$\alpha$-chloro-$\Delta^4$-pregnene-11$\beta$,17$\alpha$,19-triol-3,20-dione
6$\alpha$-fluoro-9$\alpha$-bromo-$\Delta^4$-pregnene-11$\beta$,17$\alpha$,19-triol-3,20-dione
6$\alpha$-fluoro-9$\alpha$-chloro-$\Delta^4$-pregnene-17$\alpha$,19-diol-3,11,20-trione
6$\alpha$-fluoro-9$\alpha$-bromo-$\Delta^4$-pregnene-17$\alpha$,19-diol-3,11,20-trione
6$\alpha$-fluoro-9$\alpha$-chloro-$\Delta^{1,4}$-pregnadiene-11$\beta$,17$\alpha$,19,21-tetrol-3,20-dione
6$\alpha$-fluoro-9$\alpha$-chloro-$\Delta^{1,4}$-pregnadiene-17$\alpha$,19,21-triol-3,11,20-trione
6$\alpha$-fluoro-9$\alpha$-bromo-$\Delta^{1,4}$-pregnadiene-17$\alpha$,19,21-triol-3,11,20-trione
6$\alpha$-fluoro-$\Delta^4$-pregnene-19,21-diol-3,11,20-trione
6$\alpha$-fluoro-$\Delta^4$-pregnene-17$\alpha$,19-diol-3,11,20-trione
6$\alpha$-fluoro-$\Delta^{1,4}$-pregnadiene-17$\alpha$,19-diol-3,11,20-trione
6$\alpha$,9$\alpha$-difluoro-$\Delta^{1,4}$-pregnadiene-11$\beta$,17$\alpha$-diol-3,20-dione
6$\alpha$-fluoro-$\Delta^4$-pregnene-11$\beta$,16$\alpha$,19-triol-3,20-dione
6$\alpha$-fluoro-$\Delta^4$-pregnene-16$\alpha$,19-diol-3,11,20-trione
6$\alpha$-fluoro-$\Delta^4$-pregnene-11$\beta$,16$\alpha$,17$\alpha$,19-tetrol-3,20-dione
6$\alpha$-fluoro-$\Delta^4$-pregnene-16$\alpha$,17$\alpha$,19-triol-3,11,20-trione
6$\alpha$-fluoro-$\Delta^{1,4}$-pregnadiene-11$\beta$,16$\alpha$,17$\alpha$,19,21-pentol-3,20-dione
6$\alpha$-fluoro-$\Delta^{1,4}$-pregnadiene-16$\alpha$,17$\alpha$,19,21-tetrol-3,11,20-trione
6$\alpha$-fluoro-$\Delta^4$-pregnene-11$\beta$,16$\alpha$,17$\alpha$,19,21-pentol-3,20-dione
6$\alpha$-fluoro-$\Delta^4$-pregnene-16$\alpha$,17$\alpha$,19,21-tetrol-3,11,20-trione
16$\alpha$-methyl-$\Delta^4$-pregnene-11$\beta$,17$\alpha$,19,21-tetrol-3,20-dione
16$\alpha$-methyl-9$\alpha$-bromo-$\Delta^4$-pregnene-11$\beta$,17$\alpha$,19,21-tetrol-3,20-dione
16$\alpha$-methyl-9$\alpha$-fluoro-$\Delta^4$-pregnene-11$\beta$,17$\alpha$,19,21-tetrol-3,20-dione
16$\alpha$-methyl-9$\alpha$-fluoro-$\Delta^{1,4}$-pregnadiene-11$\beta$,17$\alpha$,19,21-tetrol-3,20-dione
6$\alpha$-methyl-$\Delta^4$-pregnene-19-ol-3,11,20-trione
6$\alpha$-methyl-$\Delta^4$-pregnene-11$\beta$,17$\alpha$,19,21-tetrol-3,20-dione
6$\alpha$-methyl-$\Delta^{1,4}$-pregnadiene-11$\beta$,17$\alpha$,19,21-tetrol-3,20-dione
6$\alpha$-methyl-$\Delta^4$-pregnene-17$\alpha$,19,21-triol-3,11,20-trione
6$\alpha$-methyl-$\Delta^{1,4}$-pregnadiene-17$\alpha$,19,21-triol-3,11,20-trione
9$\alpha$-fluoro-$\Delta^{4,6}$-pregnadiene-11$\beta$,17$\alpha$,19,21-tetrol-3,20-dione
9$\alpha$-fluoro-$\Delta^{4,6}$-pregnadiene-11$\beta$,17$\alpha$,19-triol-3,20-dione
9$\alpha$-fluoro-$\Delta^4$-pregnene-11$\beta$,17$\alpha$,19,21-tetrol-3,20-dione
9$\alpha$-chloro-$\Delta^4$-pregnene-11$\beta$,17$\alpha$,19,21-tetrol-3,20-dione
9$\alpha$-bromo-$\Delta^4$-pregnene-11$\beta$,17$\alpha$,19,21-tetrol-3,20-dione
9$\alpha$-iodo-$\Delta^4$-pregnene-11$\beta$,17$\alpha$,19,21-tetrol-3,20-dione
9$\alpha$-methoxy-$\Delta^4$-pregnene-11$\beta$,17$\alpha$,19,21-tetrol-3,20-dione
9$\alpha$-ethoxy-$\Delta^4$-pregnene-11$\beta$,17$\alpha$,19,21-tetrol-3,20-dione
9$\alpha$-fluoro-$\Delta^4$-pregnene-17$\alpha$,19,21-triol-3,11,20-trione
9$\alpha$-chloro-$\Delta^4$-pregnene-17$\alpha$,19,21-triol-3,11,20-trione
9$\alpha$-bromo-$\Delta^4$-pregnene-17$\alpha$,19,21-triol-3,11,20-trione
9$\alpha$-iodo-$\Delta^4$-pregnene-17$\alpha$,19,21-triol-3,11,20-trione
9$\alpha$-methoxy-$\Delta^4$-pregnene-17$\alpha$,19,21-triol-3,11,20-trione
9$\alpha$-ethoxy-$\Delta^4$-pregnene-17$\alpha$,19,21-triol-3,11,20-trione
9$\alpha$-fluoro-$\Delta^{1,4}$-pregnadiene-11$\beta$,17$\alpha$,19,21-tetrol-3,20-dione
6$\alpha$-methyl-9$\alpha$-fluoro-$\Delta^{1,4}$-pregnadiene-11$\beta$,17$\alpha$,19,21-tetrol-3,20-dione
6$\alpha$-methyl-9$\alpha$-bromo-$\Delta^{1,4}$-pregnadiene-11$\beta$,17$\alpha$,19,21-3,20-dione
6$\alpha$-methyl-9$\alpha$-fluoro-$\Delta^4$-pregnene-11$\beta$,17$\alpha$,19,21-tetrol-3,20-dione 6α-methyl-9α-bromo-Δ⁴-pregnene - 11β,17α,19,21 - tetrol-3,20-dione
2α-methyl-Δ⁴-pregnene-11β,17α,19,21-tetrol-3,20-dione
2α-methyl-Δ⁴-pregnene-17α,19,21-triol-3,11,20-trione
2α-methyl-9α-bromo-Δ⁴-pregnene - 11β,17α,19,21 - tetrol-3,20-dione
2α-methyl-9α-fluoro-Δ⁴-pregnene - 11β,17α,19,21 - tetrol-3,20-dione
2α-methyl-9α-fluoro-Δ⁴-pregnene-17α,19,21-triol - 3,11,20-trione
Δ¹,⁴,⁶-pregnatriene-11β,17α,19,21-triol-3,20-dione
Δ⁴,⁶-pregnadiene-11β,14α,17α,19,21-pentol-3,20-dione
Δ⁴,⁶-pregnadiene-14α,17α,19,21-tetrol-3,11,20-trione Other new and therapeutically useful compounds are prepared by a two-step process comprising conversion of 6,7-dihydro compounds to Δ⁶-dehydro compounds using the process of Agnello and Laubach followed by the introduction of a 19-hydroxyl group using the process of this invention. These compounds include:

Δ⁴,⁶-pregnadiene-11β,17α,19,21-tetrol-3,20-dione
Δ¹,⁴,⁶-pregnatriene-11β,17α,19,21-tetrol-3,20-dione
Δ¹,⁴,⁶-pregnatriene-11β,14α,19,21-tetrol-3,20-dione
16α-methyl-Δ⁴,⁶-pregnadiene-11β,17α,19,21-tetrol-3,20-dione
16α-methyl-9α-bromo-Δ⁴,⁶-pregnadiene-11β,17α,19,21-tetrol-3,20-dione
16α-methyl-9α-fluoro-Δ⁴,⁶-pregnadiene-11β,17α,19,21-tetrol-3,20-dione
16α-methyl-9α-fluoro-Δ¹,⁴,⁶-pregnatriene-11β,17α,19,21-tetrol-3,20-dione
6-methyl-Δ⁴,⁶-pregnadiene-19-ol-3,11,20-trione
6-methyl-Δ⁴,⁶-pregnadiene-11β,17α,19,21-tetrol-3,20-dione
6-methyl-Δ¹,⁴,⁶-pregnatriene-11β,17α,19,21-tetrol-3,20-dione
6-methyl-Δ⁴,⁶-pregnadiene-17α,19,21-triol-3,11,20-trione
6-methyl-Δ¹,⁴,⁶-pregnatriene-17α,19,21-triol-3,11,20-trione
9α-fluoro-Δ⁴,⁶-pregnadiene-11β,17α,19,21-tetrol-3,20-dione
9α-chloro-Δ⁴,⁶-pregnadiene-11β,17α,19,21-tetrol-3,20-dione
9α-bromo-Δ⁴,⁶-pregnadiene-11β,17α,19,21-tetrol-3,20-dione
9α-iodo-Δ⁴,⁶-pregnadiene-11β,17α,19,21-tetrol-3,20-dione
9α-methoxy-Δ⁴,⁶-pregnadiene-11β,17α,19,21-tetrol-3,20-dione
9α-ethoxy-Δ⁴,⁶-pregnadiene-11β,17α,19,21-tetrol-3,20-dione
9α-fluoro-Δ⁴,⁶-pregnadiene-17α,19,21-triol-3,11,20-trione
9α-chloro-Δ⁴,⁶-pregnadiene-17α,19,21-triol-3,11,20-trione
9α-bromo-Δ⁴,⁶-pregnadiene-17α,19,21-triol-3,11,20-trione
9α-iodo-Δ⁴,⁶-pregnadiene-17α,19,21-triol-3,11,20-trione
9α-methoxy-Δ⁴,⁶-pregnadiene-17α,19,21-triol-3,11,20-trione
9α-ethoxy-Δ⁴,⁶-pregnadiene-17α,19,21-triol-3,11,20-trione
9α-fluoro-Δ¹,⁴,⁶-pregnatriene-11β,17α,19,21-tetrol-3,20-dione
6-methyl-9α-fluoro-Δ¹,⁴,⁶-pregnatriene-11β,17α,19,21-tetrol-3,20-dione
6-methyl-9α-bromo-Δ¹,⁴,⁶-pregnatriene-11β,17α,19,21-tetrol-3,20-dione
6-methyl-9α-fluoro-Δ⁴,⁶-pregnadiene-11β,17α,19,21-tetrol-3,20-dione
6-methyl-9αbromo-Δ⁴,⁶-pregnadiene-11β,17α,19,21-tetrol-3,20-dione
2α-methyl-Δ⁴,⁶-pregnadiene-11β,17α,19,21-tetrol-3,20-dione
2α-methyl-Δ⁴,⁶-pregnadiene-17α,19,21-triol-3,11,20-trione
2α-methyl-9α-bromo-Δ⁴,⁶-pregnadiene-11β,17α,19,21-tetrol-3,20-dione
2α-methyl-9α-fluoro-Δ⁴,⁶-pregnadiene-11β,17α,19,21-tetrol-3,20-dione
2α-methyl-9α-fluoro-Δ⁴,⁶-pregnadiene-17α,19,21-triol-3,11,20-trione

EXAMPLE VI

The above compounds are converted to 16α,19,21-triesters using standard procedures. The triesters which are prepared include formates, acetates, propionates, butyrates, malonates, maleates, fumarates, succinates and hemisuccinates. Those esters derived from dicarboxylic acids are converted to alkali metal and alkaline earth metal salts by reaction with a molar proportion of a base such as sodium or potassium bicarbonate.

The esters are converted to mono and diesters by hydrolysis with potassium carbonate in 10% aqueous-methanol. The course of the hydrolysis is followed by paper chromatography and the products isolated by column chromatography using the procedures of Examples I and II. It is found that an acylated hydroxyl at the 16-position is hydrolyzed first, and that hydrolysis takes place at the 21-position at a faster rate than at the 19-position. These mono and diesters serve as starting materials for the preparation of mixed esters by standard methods. Such mixed esters include, for example, the 19-acetate-21-hemisuccinate and the 16α,19-diacetate-21-propionate. Alkali metal and alkaline earth metal salts of these acid esters are likewise prepared by standard methods.

What is claimed is:

1. A compound selected from the group consisting of those having the formulas

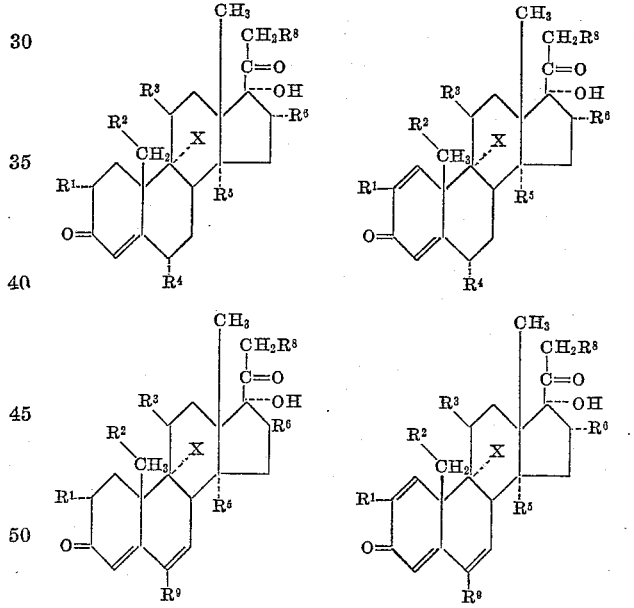

wherein X is selected from the group consisting of hydrogen, halogen, methoxy and ethoxy; $R^1$ is selected from the group consisting of hydrogen and methyl; $R^2$ is selected from the group consisting of hydroxyl and acylated hydroxyl; $R^3$ is selected from the group consisting of keto and β-hydroxyl; $R^4$ is selected from the group consisting of hydrogen, fluorine and α-methyl; $R^5$ is selected from the group consisting of hydrogen and α-hydroxyl; $R^6$ is selected from the group consisting of hydrogen, α-methyl, α-hydroxyl and acylated α-hydroxyl; $R^8$ is selected from the group consisting of hydrogen, hydroxyl and acylated hydroxyl; $R^9$ is selected from the group consisting of hydrogen and methyl; two of $R^1$, $R^4$ and $R^6$ being hydrogen in a particular compound; an acylated hydroxyl group being derived from mono and dicarboxylic acids containing up to four carbon atoms; and alkali and alkaline earth metal salts of said dicarboxylic acids.

2. A pharmaceutical composition comprising a compound as claimed in claim 1 together with a pharmaceutically acceptable carrier.

3. Δ⁴-pregnene-11β,17α,19,21-tetrol-3,20-dione.

4. Δ¹,⁴-pregnadiene-11β,17α,19,21-tetrol-3,20-dione.

5. 6α,9α-difluoro-Δ$^{1,4}$-pregnadiene-11β,17α,19,21-tetrol-3,20-dione.

6. Δ$^{1,4,6}$-pregnatriene-11β,17α,19,21-tetrol-3,20-dione.

7. 16α-methyl-9α-fluoro-Δ$^{4,6}$-pregnadiene-11β,17α,19,21-tetrol-3,20-dione.

8. 6-methyl-9α-fluoro-Δ$^{1,4,6}$-pregnatriene-11β,17α,19,21-tetrol-3,20-dione.

References Cited in the file of this patent

UNITED STATES PATENTS

| | | |
|---|---|---|
| 2,518,672 | Ehrenstein | Aug. 15, 1950 |
| 2,666,016 | Hechter et al. | Jan. 12, 1954 |
| 2,686,790 | Ehrenstein | Aug. 17, 1954 |
| 2,756,179 | Fried et al. | July 24, 1956 |
| 2,819,276 | Mihina | Jan. 7, 1958 |
| 2,856,415 | Mihina | Oct. 14, 1958 |
| 2,873,284 | Day et al. | Feb. 10, 1959 |
| 2,880,218 | Hunt et al. | Mar. 31, 1959 |
| 2,966,444 | Hasegawa et al. | Dec. 27, 1960 |

OTHER REFERENCES

Neher et al.: Helv. Chim. Acta, vol. 39 (Dec. 1, 1956), pp. 2062–2088.